United States Patent [19]
Koren et al.

[11] Patent Number: 5,374,884
[45] Date of Patent: Dec. 20, 1994

[54] MODEL-BASED POSITION-REPEATABLE DISTURBANCE COMPENSATION

[75] Inventors: Yoram Koren, Ann Arbor, Mich.; Chih-Ching Lo, Miaoli Hsien, Taiwan, Prov. of China

[73] Assignee: University of Michigan, The Board of Regents acting . . ., Ann Arbor, Mich.

[21] Appl. No.: 977,495

[22] Filed: Nov. 18, 1992

[51] Int. Cl.$^5$ ............................................. G05D 23/275
[52] U.S. Cl. .................................. 318/632; 364/474.35
[58] Field of Search ............ 318/561, 563, 565, 568.1, 318/568.18, 568.22, 568.23, 569, 571, 572, 600, 602, 615, 616, 630, 632; 364/161, 165, 166, 174, 176, 184, 474.01, 474.12, 474.15, 474.35, 149–151

[56] References Cited

U.S. PATENT DOCUMENTS

| | | | |
|---|---|---|---|
| 4,547,847 | 10/1985 | Olig et al. | 318/561 |
| 4,639,653 | 1/1987 | Anderson et al. | 318/571 X |
| 4,742,285 | 5/1988 | Sasaki et al. | 318/632 |
| 5,059,881 | 10/1991 | Fujita et al. | 318/630 |
| 5,122,964 | 6/1992 | Hayashi et al. | 364/472 |
| 5,187,417 | 2/1993 | Minnich et al. | 318/600 X |

*Primary Examiner*—Jonathan Wysocki
*Attorney, Agent, or Firm*—Rohm & Monsanto

[57] ABSTRACT

A system for compensating for the effects of friction and other forces resulting from repeatable disturbances in a servo system or a numerically controlled machine employs a software-based mathematical model which has certain parameters associated therewith. The parameters are calibrated for the specific characteristics of the system using either off-line or on-line methods, and include dynamic correction for continuous correction, as would be required to compensate for forces which disturb a desired motion. The compensation model is implemented in two stages: (i) building a calibrated mathematical model that describes a repeatable disturbance force, such as friction, and (ii) using the model in real time to compensate for the disturbance force. The model provides a compensation signal which is combined with the original controller signal to yield a compensated control signal. The compensation may be in the form of a position offset. This compensation system is general in its application and can compensate for any deterministic repeatable action that disturbs or acts against the motion of a numerically controlled, or servo, system.

39 Claims, 4 Drawing Sheets

001
MODEL-BASED POSITION-REPEATABLE DISTURBANCE COMPENSATION

BACKGROUND OF THE INVENTION

This invention relates generally to systems for controlling with greatly improved accuracy the motion of servo systems, numerically controlled systems, and any other system which produces controlled motion in response to a control signal, and more particularly, to a system which provides control signal compensation for forces which disturb the motion of the system, such as friction forces, whereby the resulting motion corresponds accurately to the desired motion.

The tracking ability of moving slides or rotating shafts to position or velocity commands deteriorates because of the friction forces in the guideways, leadscrews, gears, and other resistance forces caused by the slide assembly. When the combined motion of two slides (x, y) that are not parallel (e.g., perpendicular) is needed, the tracking deficiency causes a position error in the resultant trajectory, as shown in FIG. 1. In machining, this position error along the part contour is called the contour error. One of the reasons that a part cannot be machined on a milling machine precisely to a desired contour is that the friction in the guideways in the x, y and z axes of motion disturbs, or counteracts, the intended motion of the machine tool, ultimately resulting in contour errors.

Milling machines are not the only systems which are subject to loss of accuracy due to the effects of friction and other forces which disturb the motion. Other products that may benefit from a system which compensates for such disturbances include machine tools, robots, welders, laser-beam cutters and welders, water-jet cutters, medical scanners, weapon tracking systems (missile launchers, anti-aircraft cannons, tanks, etc.), and any other system requiring a motion of one slide or shaft, or a combined motion of several axes, for its operation. An additional family of products where compensation for repeatable disturbances is useful includes optical measurement and inspection systems of the type which use moving members as part of the measurement system.

It is, therefore, an object of this invention to provide a simple and economical system for controlling the motion of a servo system so that it travels accurately and precisely along a desired predetermined path;

It is another object of this invention to provide a system which reduces position errors and contour errors in a numerically controlled system.

It is a further object of this invention to provide a system which compensates for the effects of undesirable forces which disturb the motion of a numerically controlled system.

It is also an object of this invention to improve the trackability of a moving slide or a rotating shaft by compensating for stiction.

It is additionally an object of this invention to improve the tracking ability of moving slides and rotating shafts to velocity or position commands.

It is yet a further object of this invention to improve the position precision of systems that combine motion of two or more moving slides or shafts by compensating for the friction of the guideways, leadscrews, gears, and other moving members.

It is also another object of this invention to reduce position tracking error resulting from friction.

It is yet an additional object of this invention to provide a system which reduces errors resulting from repeatable disturbances, such as friction.

It is still another object of this invention to provide a system which reduces errors in controlled cyclical motion resulting from repeatable disturbances, such as friction.

It is yet another object of the invention to provide a system which reduces errors resulting from stiction.

SUMMARY OF THE INVENTION

The foregoing and other objects are achieved by this invention which provides compensation with a model which is implemented in two stages: (i) building a calibrated mathematical model that describes a repeatable disturbance force, such as friction, and (ii) using the model in real time to compensate for the disturbance force. The compensation system of the present invention is general in its application and can compensate for any deterministic action that disturbs or acts against the motion of a numerically controlled, or servo, system.

With respect to the building of an illustrative friction model embodiment of the invention, it has been determined by the inventors herein that a dynamic component with a frequency $f = 2\pi V/L$ (where V=axis velocity and L=leadscrew pitch), rides on the static friction force. This forms the basis of a significant, continuous compensation feature of the present invention.

In accordance with a first method aspect of the invention, there is provided a method of building a calibrated model of a repeatable error of a servo system controlled by a closed-loop servo system which includes the steps of:

adjusting the controller parameters such that the controller becomes a proportional type controller;

generating a ramp control signal having a derivative which is a known desired value;

measuring an offset error corresponding to a difference between a desired state and an actual feedback state;

defining a mathematical model corresponding generally to a repeatable characteristic of the disturbance;

employing the known system parameters and the known desired state derivative value to calibrate the disturbance model as a function of the actual state of the system; and storing the disturbance model as a function of the state of the system.

In one embodiment of the first method aspect of the invention, the predetermined state ramp corresponds to a ramp-position of the servo-system, and its derivative becomes a known desired velocity. In such an embodiment, the offset error is the position error, and the disturbance model is stored as a function of the actual position of the system.

In accordance with a second method aspect of the invention, a method of compensating for repeatable error conditions in the operation of a servo system controlled by a servo control system, the method includes the steps of:

storing a calibrated disturbance model that is a function corresponding to a predeterminable error component of the repeatable error conditions:

generating a servo control signal corresponding to a motion desired to be executed by the servo system;

reading a state signal responsive to a predetermined state of the servo system;

calculating a disturbance function value in response to the state signal; and combining the disturbance function value with the servo control signal to produce an error-compensated servo control signal.

In one embodiment of the second method aspect of the invention, the predetermined state corresponds to a position of the servo system. In such an embodiment, the disturbance function value corresponds to a position state.

In an embodiment of the invention in which the system contains a leadscrew, the disturbance function corresponds to the relationship:

$$D = D_0[1+\beta \sin(\Phi + 2\pi P/L)] \text{sign}(V)$$

where, $$D_0 = \alpha_0 + \alpha_1|V| + \alpha_2 V^2 \text{ for } -V^* \leq V \leq V^*$$

$$D_0 = D^* \text{ for } |V| \geq V^*.$$

The calibration model provides the steps of storing parameter values corresponding to $\alpha_0$, $\alpha_1$, $\alpha_2$, $\beta$, $\Phi$, and $V^*$. The parameter values include respective values for each axis of motion of the servo system. P corresponds to the instantaneous position of a slide member of the servo system, and $P = Vt$. In this embodiment of the invention the slide member is moved in response to rotation of a leadscrew, and L corresponds to the leadscrew pitch.

As previously noted, the error-compensated servo control signal contains, in certain embodiments, a dynamic component which is substantially continuous in time. The dynamic component corresponds to compensation for a force which tends to disturb a rotative motion of the servo system.

In accordance with a further method aspect of the invention, a method of controlling the operation of a numerically controlled apparatus includes the steps of:

defining a model corresponding generally to a repeatable disturbance force characteristic of the numerically controlled apparatus;

calibrating the model whereby the calibrated model corresponds specifically to the repeatable disturbance force characteristic of the numerically controlled apparatus;

storing the model values as a function of state information;

providing state information corresponding to the state of the numerically controlled machine to the calibrated model to produce a model value; and combining the model value with a control signal corresponding to an action desired to be executed by the numerically controlled apparatus for forming a compensated control signal.

In a highly advantageous embodiment of the invention, the model has a dynamic component corresponding to a repeatable dynamic disturbance force characteristic of the numerically controlled apparatus. The dynamic component has a frequency component corresponding to a cyclical movement of the numerically controlled apparatus. In such an embodiment, the model value is combined with the control signal for forming a dynamically compensated control signal.

The state of the numerically controlled apparatus is obtained from encoders which provide data in the form of state information. Such state information is responsive to the position of at least one component of the numerically controlled apparatus, or to velocity information which, in certain embodiments, corresponds to the rate of movement of at least one component of the numerically controlled apparatus.

In accordance with an apparatus aspect of the invention, a system for controlling the operation of a numerically controlled arrangement, is provided with a controller having an input for receiving a position signal responsive to the position of the numerically controlled arrangement, and an output coupled to the numerically controlled arrangement for producing a control signal corresponding to a desired motion of the numerically controlled arrangement.

A compensator computer produces at an output thereof an error compensation signal, the compensator computer having a memory associated therewith for storing model information corresponding generally to a repeatable disturbance force characteristic of the numerically controlled apparatus. The compensator computer additionally has an input for receiving a position signal responsive to the position of the numerically controlled arrangement. The control signal and the error compensation signal are combined in a combiner which produces at an output thereof an error-compensated control signal.

In a specific illustrative embodiment of the invention, there is further provided a position signal combiner having a first input for receiving a position signal responsive to the position of the numerically controlled arrangement, a second input for receiving a reference position signal responsive to a reference position of the numerically controlled arrangement, and an output for producing a signal corresponding to a difference between the position signal and the reference position signal.

In further embodiments, there is additionally provided a velocity calculator for providing a speed signal corresponding to the speed of at least one portion of the numerically controlled arrangement. The speed signal is responsive to the magnitude of a change in position of the numerically controlled arrangement within a sample period. Thus, the error compensation signal corresponds to a velocity direction and magnitude.

In one embodiment of the invention, the model information corresponds to the relationship:

$$D = D_0[1+\beta \sin(\Phi + 2\pi P/L)] \text{ sign}(V)$$

where, $$D_0 = \alpha_0 + \alpha_1|V| + \alpha_2 V^2 \text{ for } -V^* \leq V \leq V^*$$

$$D_0 = D \text{ for } |V| \geq V^*.$$

In embodiments where the motion to be compensated corresponds to rotary motion, the model information corresponds to the relationship:

$$D = D_0[1+\beta \sin(\Phi + 2\pi P/2\pi R)] \text{sign}(V)$$

In these relationships, the dynamic component has a frequency $f = 2\pi V/L$ where V is the axis velocity and L is the leadscrew pitch. The dynamic component rides on the static friction force. The position P is related to the velocity by the relationship P=Vt. In rotary transmission arrangements, L is replaced by $2\pi R$, where R is the radius of the largest gear wheel. Thus, the frequency of the dynamic component is f=V/R. The smaller gear wheels generate higher frequencies which ride on the low frequency.

The specific embodiment of the compensator computer described herein is additionally provided with a memory for storing values for a calibration parameter, the calibration parameters include, in this embodiment, $\alpha_0$, $\alpha_1$, $\alpha_2$, $\beta$, $\Phi$, and $V^*$.

In another embodiment of the invention, the compensator computer compensates for stiction in moving elements.

BRIEF DESCRIPTION OF THE DRAWING

Comprehension of the invention is facilitated by reading the following detailed description, in conjunction with the annexed drawing, in which.

DETAILED DESCRIPTION

Figure 1:
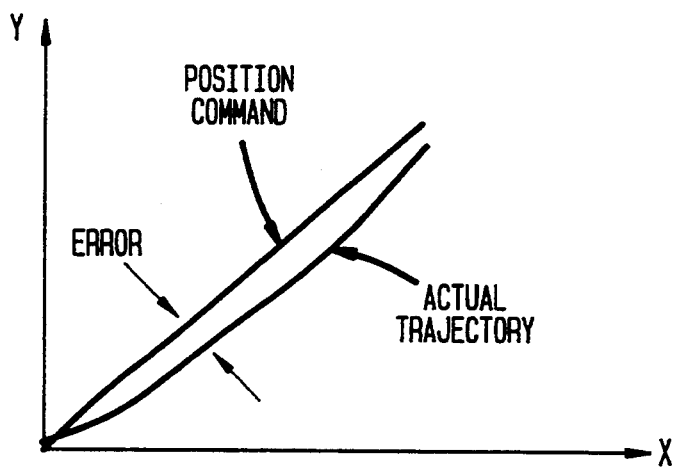
FIG. 1 is a graphical representation which is useful to illustrate the effect of error in the prior art as a variance between position commands and the actual trajectory of two movable axes of a milling machine, the error being caused by friction or other disturbance.
Figure 2:
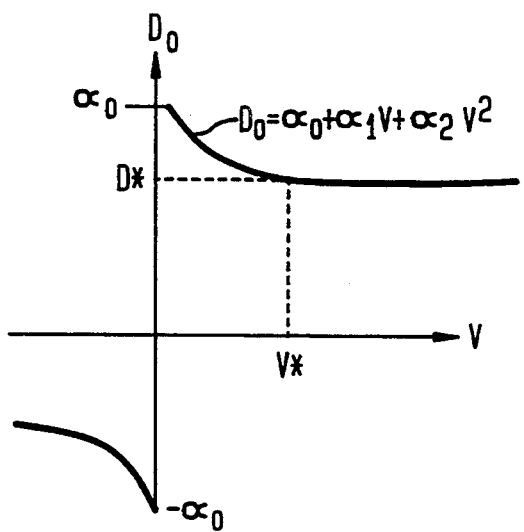
FIG. 2 is a graphical representation which illustrates the conventional relationship between friction and velocity, but with the mathematical representations of the present invention.
Figure 3:
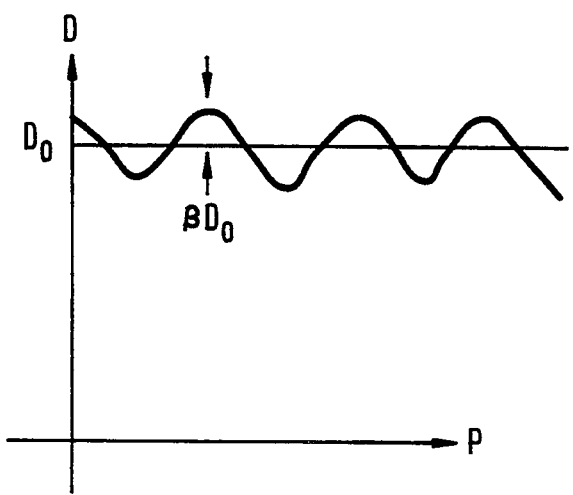
FIG. 3 is a graphical representation which illustrates the inventive relationship between friction and position.

The mathematical model employed in the friction compensation system of the present invention is depicted in FIG. 2 and is stated as follows:.

$$D = D_0[1 + \beta \sin(\Phi + 2\pi P/L)] \text{sign}(V) \qquad (1)$$

where, $$D_0 = \alpha_0 + \alpha_1|V| + \alpha_2 V^2 \text{ for } -V^* \leq V \leq V^* \qquad (2)$$

$$D_0 = D \text{ for } |V| \geq V^*$$

Note that for a constant velocity, $D_0$ is a constant.

The parameters $\alpha_0$, $\alpha_1$, $\alpha_2$, $\beta$, $\Phi$, and $V^*$ are calibrated for each axis of motion and for each moving direction. P is the instantaneous position of the slide (in absolute coordinates), and P=Vt. The leadscrew pitch is indicated by L, which is a known constant.

Eq. (1) shows that the friction force contains a dynamic component when the slide motion is executed by a leadscrew. The term "friction force" as used herein means the force that exists between two bodies in contact that resists the motion of one body relative to the other.

Periodic signals also appear in other rotary transmission mechanisms such as gear trains, etc. In these cases, the term L in Eq. (1) is replaced by $2\pi R$, where R is the radius of the largest gear wheel. The smaller gear wheels would generate higher frequencies which ride on the low frequency.

Figure 4:
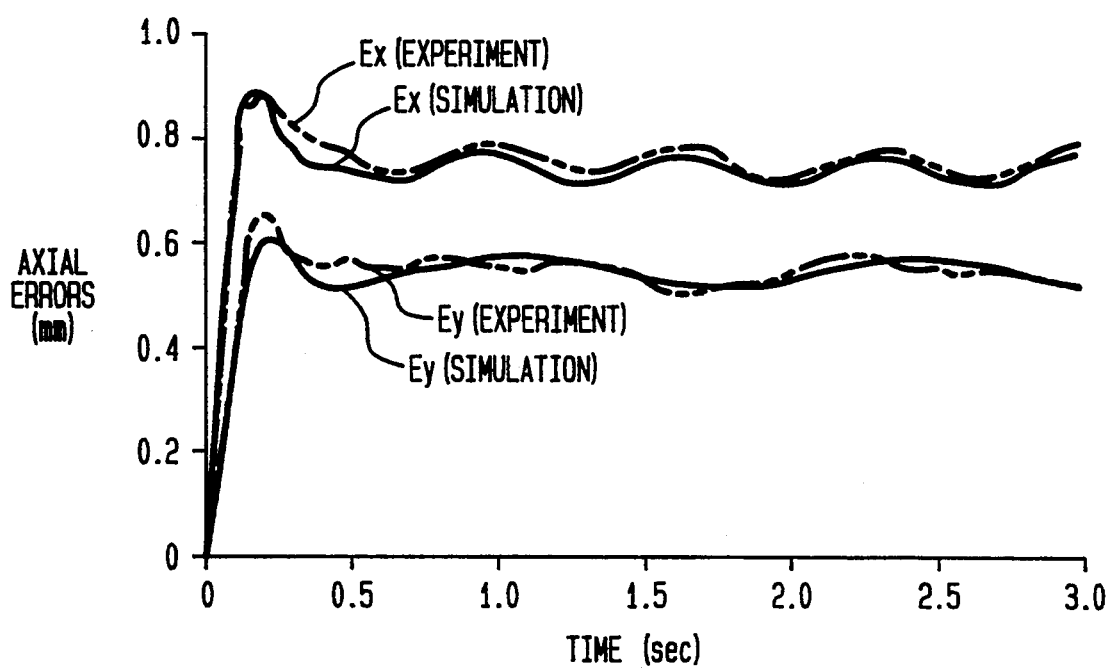
FIG. 4 is a graphical representation which illustrates the extent of correlation between experimental and simulated results in linear motion at an angle of 26.6° with respect to the x-axis, at a feed rate of 0.51 m/min, or 20.1 in/min.
Figure 5:
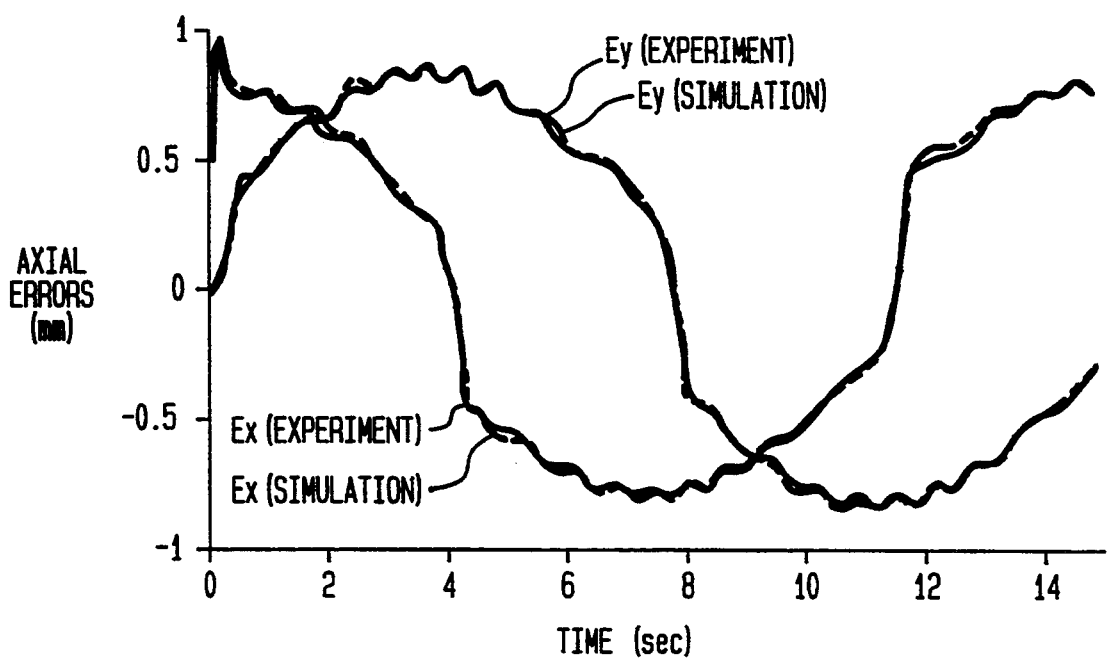
FIG. 5 is a graphical representation which illustrates the extent of correlation between experimental and simulated results in circular motion at a radius of 20 mm and a feed rate of 0.5 m/min, or 19.8 in/min.

The validity of the model represented by Eqs. (1) and (2) is demonstrated in FIGS. 4 and 5, in which straight line and circular motions, respectively, were simulated and subsequently produced on a milling machine. The excellent fit between the simulation and the experimental results show the validity of the model presented above.

PARAMETER CALIBRATION

The calibration of the six parameters $\alpha_0$, $\alpha_1$, $\alpha_2$, $\beta$, $\Phi$, and $V^*$ can be done either off-line or in real time. In the off-line method the error E is recorded in several experimental motions, each performed at a different velocity $V_T$ (at least three experiments are needed). A computer program that simulates a control loop with Eqs. (1) and (2) as disturbances and error E as output is written. By manipulating the six parameters, by empirical methods and with the use of an algorithm, such as least-squares, the simulated E is brought to be as close as practicable to the experimental E (see FIGS. 4 and 5).

The real-time calibration method utilizes the well known position error equation of linear Type-1 control systems in response to a position ramp input (R):

$$E(t) = K_1 V_T(t) + K_2 D(t) \qquad (3)$$

where $V_{96}$ is the desired position-rate, and $K_1$ and $K_2$ are known gain constants that depend on the control-loop structure and motor parameters. In the calibration mode, the controller parameters may be adjusted such that the controller becomes of a proportional type, and in turn, the system is of Type 1. Nevertheless, even in a case where the system is not Type-1, $K_1$ and $K_2$ are known differential or integral operators which can be expressed in terms of known control gains. Thus, the present invention is of general applicability.

The type of systems considered here have repeatable disturbances in terms of the position P (i.e., during every revolution of the leadscrew, or gear wheel, the same disturbance pattern appears). For these systems Eq. (3) may be rewritten as $$E(P,t) = K_1 V_T(t) + K_2 D(P,t) \qquad (4)$$

The notation E(P,t) is used to emphasize that the deterministic error is repeatable as a function of the axis position, P. Since the error signal E is measurable and completely accessible, the $V_T(t)$ is known (prescribed by the controller), the disturbance can be measured indirectly or estimated, by the following equation:

$$D(t) = \frac{E(P,t) - K_1 V_T(t)}{K_2} \quad (5)$$

This is a general method discovered by the inventors herein for estimating and calibrating the disturbances. For the particular case of friction calibration, a constant velocity $V_T(V_T<V^*)$ is applied, then $D_0$ in Eq. (2) is also a constant, and the disturbance is characterized by Eq. (1). A comparison of Eqs. (1) and (5) yields:

$$\frac{E - K_1 V_T}{K_2} = D_0[1 + \beta \sin(\phi + 2\pi P/L)]\text{sign}(V) \quad (6)$$

E is a variable accessible in the control computer, and therefore the left-hand side of Eq. (4) describes a measured variable. The average of this variable during the steady state period (in FIG. 4 for t>0.4 sec) is $D_0$. The difference between the maximum and minimum values is $\beta D_0$. The third parameter $\Phi$ is determined by measuring D at its maximum point for a particular measured P, which yields:

$$\Phi + 2\pi P/L = \pi/2 \quad (7)$$

The parameter $V^*$ is obtained by a gradual increase of the velocity $V_T$ and corresponding calculation of $D_0$ for each $V_T$. The velocity at which $D_0$ is not changing is $V^*$.

The parameters $\alpha_0$, $\alpha_1$ and $\alpha_2$ are calculated from three values of $D_0$ obtained in three experiments performed at low velocities ($V_T<V^*$).

All these six parameters are stored (e.g., in a PROM, or in software) and subsequently utilized in the compensation scheme.

REAL-TIME COMPENSATION

The calibrated model is subsequently used to compensate for the friction or other repeatable disturbance force inherent in the controlled system (not shown). The block diagram of the compensated control structure is shown in FIG. 6.

Figure 6:
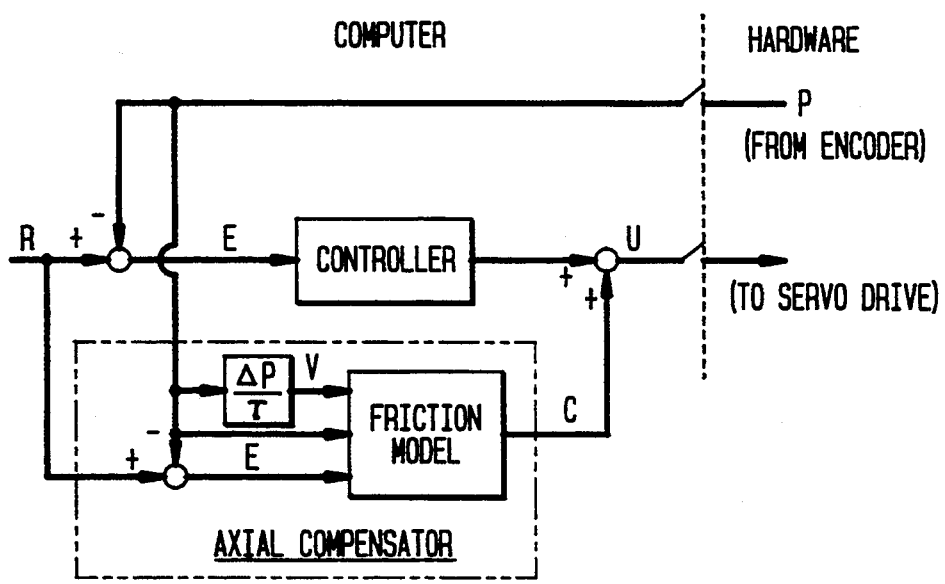
FIG. 6 is a block and line representation of a system for effecting compensation in accordance with the principles of the invention.

As shown in FIG. 6, a Controller receives a signal E which corresponds to the difference between a signal R, which corresponds to a reference position, and a signal P, which corresponds to the position information received from the encoder (not shown) in the hardware portion (not shown) of the system. The model given in Eqs. (1) and (2) is programmed for each axis of motion (FIG. 6 shows a single axis), the model being designated schematically by the function block entitled Friction Model in the Axial Compensator. As shown in this figure, the Friction Model is arranged to receive a signal E, which is similar to that described hereinabove, as well as the signal P, from the encoder in the hardware (not shown). In addition, the Friction Model receives a velocity signal V, and generates at its output a compensation signal C. The compensation signal C, therefore, depends on the axis instantaneous position P, and is added to the original command signal to obtain U, which is sent to the power unit that drives the motor (not shown) in the Hardware section. U, therefore, corresponds to the compensated command signal, and is propagated to the servo drive system (not shown). It is important to note that the compensation signal preferably is added as close as possible to the servo drive input.

The value of the signal V can be either measured by a tachometer, or calculated from the encoder readings at each sampling period T as shown in FIG. 6. More specifically, the velocity V can be calculated by dividing the change in position, $\Delta P$, by the duration, T, of one sample period.

The friction model must have an additional component to represent the behavior at very small velocities (V=0). When the sliding surface starts to move from rest, a phenomenon called "stiction" occurs. During stiction, the two surfaces are in intermittent contact, and the friction may be at any value in the range $-\alpha_0<D<\alpha_0$ (see, FIG. 2). To guarantee a smooth motion of these very small velocities, the following conditions are added to the compensation method:

If $|E| \geq 2$ BLU and $V\approx 0$ then $C=\alpha_0$
If $|E| < 2$ BLU and $V\approx 0$ then $C=0$ A BLU is the basic length-unit or the resolution of the system (e.g., a typical BLU in machine tool control is 0.01 mm). $|E| \geq 2$ BLU shows that the control system issued a motion command. However, $|E| < 1$ BLU is at the noise level and cannot be used as an indicator. This method provides automatic sensing of, and compensation for, stiction.

Figure 7:
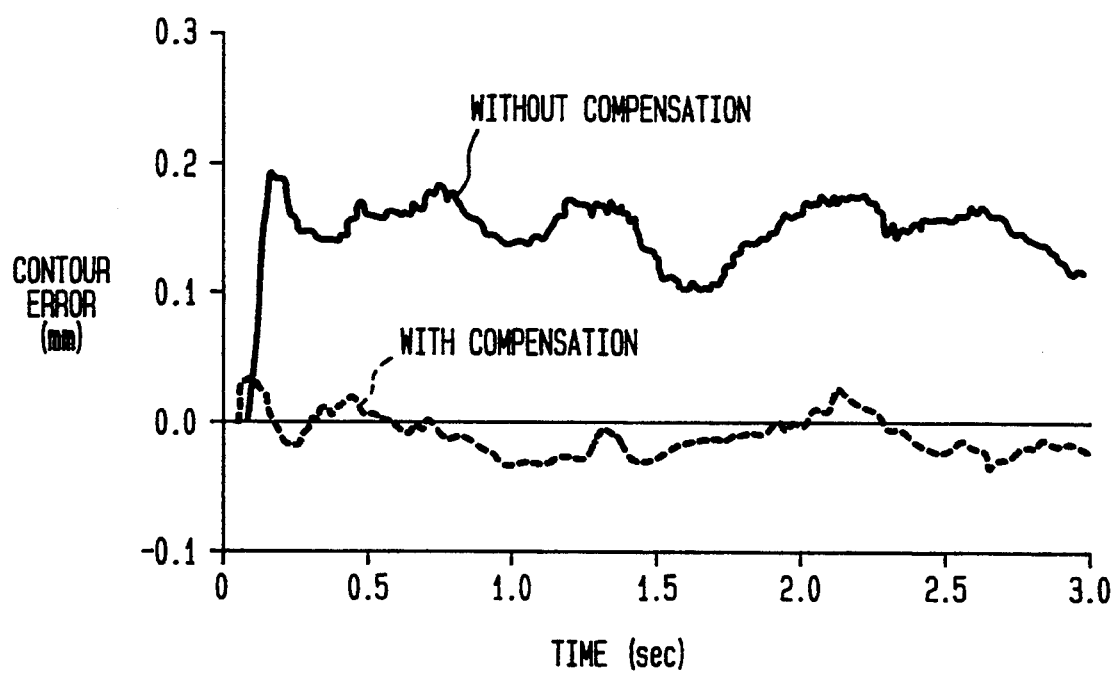
FIG. 7 is a graphical representation which illustrates experimentally the effect of compensation utilizing the method of the present invention for a linear motion, at a feed rate of 0.51 m/min, or 20.1 in/min.
Figure 8:
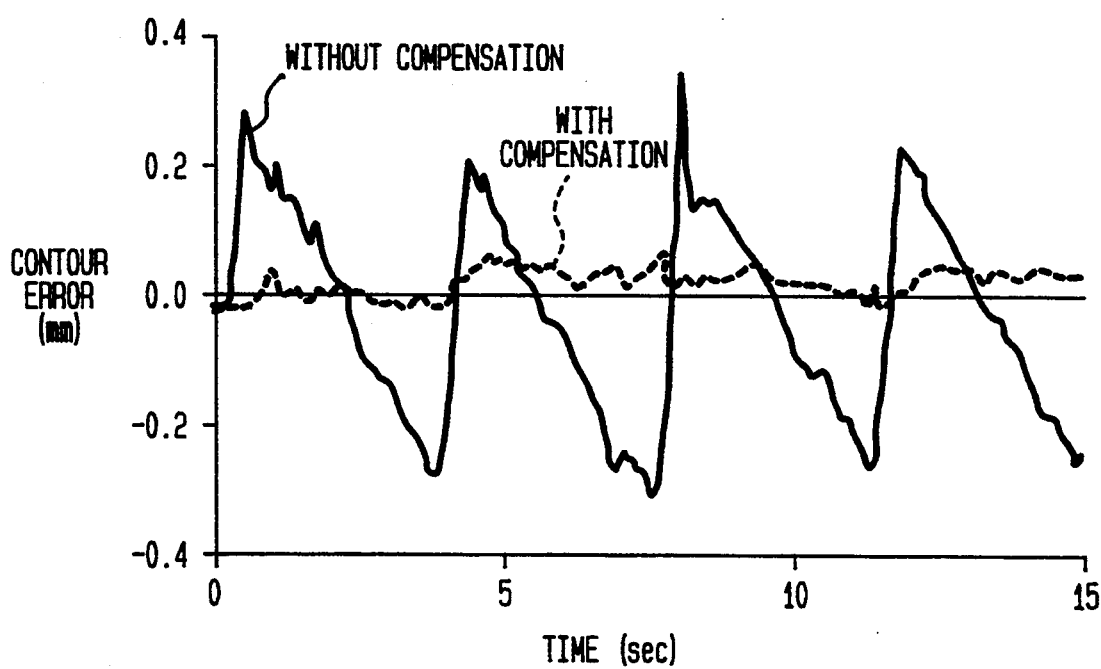
FIG. 8 is a graphical representation which illustrates experimentally the effect of compensation for a circular motion, at a radius of 20 mm, at a feed rate of 0.5 m/min, or 19.8 in/min.

The effectiveness of the proposed compensation method is shown in FIGS. 7 and 8, for a production of straight-line and a circular motions, respectively, on an x-y milling machine. The friction compensation method provides a contour error reduction of 6:1 for the straight line motion and 4.7:1 for the circular motion.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. A method of compensating for repeatable error conditions in the operation of a servo system controlled by a servo control system, the method comprising the steps of:

storing a disturbance function corresponding to a predeterminable error component of the repeatable error conditions, the predeterminable error component of the repeatable error conditions corresponding to an external force operating on the servo control system and which acts against a desired motion of the servo control system:

generating a servo control signal corresponding to a motion desired to be executed by the servo system;

receiving a state signal responsive to a predetermined physical state of the servo system;

calculating a disturbance function value in response to said state signal;

generating a disturbance function signal responsive to said disturbance function value;

combining said disturbance function signal with said servo control signal to produce an error-compensated servo control signal; and conducting said error-compensated servo control signal to the servo system whereby the resulting motion of the servo system conforms to the motion represented by the servo control signal.

2. The method of claim 1 wherein said predetermined physical state corresponds to a position of the servo system.

3. The method of claim 2 wherein said disturbance function value corresponds to a position offset.

4. The method of claim 1 wherein said disturbance function corresponds to a friction characteristic of the servo system.

5. The method of claim 4 wherein said force offset corresponds to a stiction characteristic of the servo system.

6. The method of claim 1 wherein said disturbance function corresponds to the relationship:

$$D = D_0[1 + \beta \sin(\Phi + 2\pi P/L)] \text{sign}(V)$$

where, $$D_0 = \alpha_0 + \alpha_1 |V| + \alpha_2 V^2 \text{ for } -V^* \leq V \leq V^*$$

$$D_0 = D^* \text{ for } |V| \geq V^*.$$

7. The method of claim 6 wherein there is further provided the step of storing parameter values corresponding to $\alpha_0, \alpha_1, \alpha_2, \beta, \Phi,$ and $V^*$.

8. The method of claim 7 wherein said parameter values include respective values for each axis of motion of the servo system.

9. The method of claim 6 wherein P corresponds to the instantaneous position of a slide member of the servo system, and $P = Vt$.

10. The method of claim 9 wherein said slide member is moved in response to rotation of a leadscrew, and L corresponds to the leadscrew pitch.

11. The method of claim 1 wherein said error-compensated servo control signal contains a dynamic component which is substantially continuous in time.

12. The method of claim 11 wherein said dynamic component corresponds to compensation of a force which tends to disturb a rotative motion of the servo system.

13. A method of controlling the operation of a numerically controlled apparatus to perform a desired action, the method comprising the steps of:

defining a model corresponding generally to a repeatable force characteristic of the numerically controlled apparatus, the repeatable force characteristic being external and operating against the desired action of the numerically controlled apparatus;

calibrating said model whereby said calibrated model corresponds specifically to said repeatable force characteristic of the numerically controlled apparatus;

providing state information corresponding to the state of the numerically controlled machine to said calibrated model to produce a model value signal corresponding to a model value;

producing a control signal corresponding to an action desired to be executed by the numerically controlled apparatus;

combining said model value signal with said control signal for forming a compensated control signal; and conducting said compensated control signal to the numerically controlled apparatus, whereby the numerically controlled apparatus is caused to execute the desired action in accordance with said control signal, said repeatable force characteristic of the numerically controlled apparatus being compensated by said model value signal component of said compensated control signal.

14. The method of claim 13 wherein said model has a dynamic component corresponding to a repeatable dynamic force characteristic of the numerically controlled apparatus.

15. The method of claim 14 wherein said dynamic component has a frequency component corresponding to a cyclical movement of the numerically controlled apparatus, and said step of combining comprises the further step of combining said dynamic component of said model value with said control signal for forming a dynamically compensated control signal.

16. The method of claim 13 wherein said state information is responsive to position information corresponding to the position of at least one component of the numerically controlled apparatus.

17. The method of claim 13 wherein said state information is responsive to velocity information corresponding to the rate of movement of at least one component of the numerically controlled apparatus.

18. A system for controlling the operation of a numerically controlled arrangement, the system comprising:

controller means having an input for receiving a position signal responsive to the position of the numerically controlled arrangement, and an output coupled to the numerically controlled arrangement for producing a control signal corresponding to a desired motion of the numerically controlled arrangement;

compensator computer means for producing at an output thereof an error compensation signal for compensating for an external repeatable force which operates against the desired motion of the numerically controlled apparatus, said compensator computer means having memory means for storing model information corresponding generally to a repeatable force characteristic of the numerically controlled apparatus, and an input for receiving a position signal responsive to the position of the numerically controlled arrangement;

combiner means for combining said control signal and said error compensation signal and producing at an output thereof an error-compensated control signal; and means for conducting said error-compensated control signal to the numerically controlled arrangement, whereby the numerically controlled arrangement is operated in accordance with the desired motion.

19. The system of claim 18 wherein there is further provided position signal combiner means having a first input for receiving a position signal responsive to the position of the numerically controlled arrangement, a second input for receiving a reference position signal responsive to a reference position of the numerically controlled arrangement, and an output for producing a relative position signal corresponding to a difference between said position signal and said reference position signal.

20. The system of claim 18 wherein there is further provided velocity calculator means for providing a speed signal corresponding to a speed of the numerically controlled arrangement.

21. The system of claim 20 wherein said speed signal is responsive to the magnitude of a change in position of the numerically controlled arrangement within a sample period.

22. The system of claim 18 wherein said error compensation signal corresponds to a velocity offset signal.

23. The system of claim 18 wherein said error compensation signal corresponds to a torque offset signal.

24. The system of claim 18 wherein said model information corresponds to the relationship:

$$D = D_0[1 + \beta \sin(\Phi + 2\pi P/L)] sign(V) \quad (1)$$

where, $$D_0 = \alpha_0 + \alpha_1|V| + \alpha_2 V^2 \text{ for } -V^* \leq V \leq V^*$$

$$D_0 = D \text{ for } |V| \geq V^*.$$

25. The system of claim 18 wherein said model information corresponds to the relationship:

$$D = D_0[1 + \beta \sin(\Phi + 2\pi P/2\pi R)] sign(V)$$

where, $$D_0 = \alpha_0 + \alpha_1|V| + \alpha_2 V^2 \text{ for } -V^* \leq V \leq V^*$$

$$D_0 = D \text{ for } |V| \geq V^*.$$

26. The system of claim 18 wherein said compensator computer means is further provided with parameter memory means for storing values for a calibration parameter, said calibration parameter corresponding to at least one of $\alpha_0 \alpha_1$, $\alpha_2$, $\beta$, $\Phi$, and $V^*$.

27. The system of claim 26 wherein said compensator computer means is further provided with compensation for stiction.

28. A method of forming and calibrating a disturbance model corresponding to a repeatable error of a servo system in a closed-loop servo system of the type which is controlled by a controller characterized by known controller parameters, the method comprising the steps of:
  adjusting the controller parameters such that the controller functions as a proportional-type controller;
  generating a ramp control signal having a derivative which is a known desired value;
  measuring an offset error corresponding to a difference between a desired state of the servo system and a corresponding actual feedback state of the servo system;
  defining the disturbance model to correspond generally to a repeatable characteristic of the servo system, said repeatable characteristic of the servo system corresponding to a repeatable force which operates against a desired motion of the servo system; and
  employing the known controller parameters and the known desired state derivative value to calibrate the disturbance model as a function of the actual state of the system.

29. The method of claim 28 wherein said ramp control signal corresponds to a ramp position of the servo system.

30. The method of claim 29 wherein said known desired value of said derivative corresponds to a known desired velocity.

31. The method of claim 29 wherein said measured offset error is a position error.

32. The method of claim 28 wherein there is further provided the step of storing the disturbance model as a function of the actual state of the system.

33. The method of claim 28 wherein there is further provided the step of calibrating a disturbance function which is generally characterized as:

$$D = D_0[1 + \beta \sin(\Phi + 2\pi P/L)] sign(V) \quad (1)$$

where, $$D_0 = \alpha_0 + \alpha_1|V| + \alpha_2 V^2 \text{ for } -V^* \leq V \leq V^* \quad (2)$$

$$D_0 = D \text{ for } |V| \geq V^*.$$

34. The method of claim 33 wherein said step of calibrating comprises the further steps of:
  recording an error E a plurality of times, each such time at a different velocity $V_T$;
  simulating a control loop with Eqs. (1) and (2) as disturbances and error E as output; and
  manipulating the parameters by empirical methods whereby the simulated E is brought to be as close as practicable to the experimental E, in accordance with:

$$E(P,t) = K_1 V_T(t) + K_2 D(P,t) \quad (4).$$

35. A method of compensating for repeatable error conditions in the operation of a servo system, the method comprising the steps of:
  calibrating a disturbance function which is generally characterized as:

$$D = D_0[1 + \beta \sin(\Phi + 2\pi P/L)] sign(V) \quad 2)$$

where, $$D_0 = \alpha_0 + \alpha_1|V| + \alpha_2 V^2 \text{ for } -V^* \leq V \leq V^* \quad (2)$$

$$D_0 = D \text{ for } |V| \geq V^*.$$

generating an error-compensating signal responsive to said disturbance function, said error-compensating signal compensating for an external repeatable force characteristic which operates against a desired motion of the servo system; and
  conducting the error-compensating signal to the servo system.

36. The method of claim 35 wherein the servo system comprises a slide moved in response to rotation of a leadscrew, and said step of calibrating comprises the further step of calibrating the parameters $\alpha_0$, $\alpha_1$, $\alpha_2$, $\beta$, $\Phi$, and $V^*$ for each axis of motion, where P is the instantaneous position of the slide, $P = Vt$, and L is a known constant corresponding to a leadscrew pitch.

37. The method of claim 35 wherein the servo system comprises a gear train, and said step of calibrating comprises the further step of calibrating the parameters $\alpha_0$, $\alpha_1$, $\alpha_2$, $\beta$, $\Phi$, and $V^*$ for each axis of motion, where P is the instantaneous position of the slide, $P = Vt$, and L is a known constant corresponding to $2\pi R$, where R is the radius of the largest gear wheel in said gear train.

38. The method of claim 35 wherein said step of calibrating comprises the further steps of:
  recording an error E a plurality of times, each such time at a different velocity $V_T$;

simulating a control loop with Eqs. (1) and (2) as disturbances and error E as output; and manipulating the parameters by empirical methods whereby the simulated E is brought to be as close as practicable to the experimental E, in accordance with:

$$E(P,t) = K_1 V_T(t) + K_2 D(P,t) \qquad (4).$$

39. The method of claim 35 wherein said step of calibrating comprises the further steps of:

providing to a controller of the servo system a signal E corresponding to the difference between an actual position signal and a reference position;

providing to the friction model a velocity signal V;

Providing at an output of said friction model a compensation signal C responsive to instantaneous position P of the servo system; and combining said compensation signal with a command signal from said controller to produce a compensated command signal U.

* * * * *